(12) United States Patent
Dai et al.

(10) Patent No.: US 10,313,234 B2
(45) Date of Patent: Jun. 4, 2019

(54) RSVP MAKE-BEFORE-BREAK LABEL REUSE

(71) Applicant: Juniper Networks, Inc., Sunnyvale, CA (US)

(72) Inventors: Minjie Dai, San Jose, CA (US); Yimin Shen, Shrewsbury, MA (US); Raveendra Torvi, Nashua, NH (US); Markus Jork, Andover, MA (US); Yakov Rekhter, New York, NY (US); Natrajan Venkataraman, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/834,722

(22) Filed: Dec. 7, 2017

(65) Prior Publication Data

US 2018/0097726 A1 Apr. 5, 2018

Related U.S. Application Data

(63) Continuation of application No. 14/682,799, filed on Apr. 9, 2015, now Pat. No. 9,843,508.

(30) Foreign Application Priority Data

Mar. 6, 2015 (IN) .......................... 1116/CHE/2015

(51) Int. Cl.
*H04L 12/723* (2013.01)
*H04L 12/735* (2013.01)

(52) U.S. Cl.
CPC .......... *H04L 45/507* (2013.01); *H04L 45/128* (2013.01); *H04L 45/50* (2013.01)

(58) Field of Classification Search
None
See application file for complete search history.

(56) References Cited

U.S. PATENT DOCUMENTS 8,077,726 B1 12/2011 Kumar et al.
8,310,957 B1 * 11/2012 Rekhter .............. H04L 12/4641
370/256

(Continued)

FOREIGN PATENT DOCUMENTS

CN 101257455 A 9/2008
CN 101552715 A 10/2009

(Continued)

OTHER PUBLICATIONS

Awduche et al., "RSVP-TE: Extensions to RSVP for LSP Tunnels, draft-ietf-mpls-rsvp-lsp-tunnel-09.txt" Network Norking Group, Internet Draft, Aug. 2001, 64 pp.

(Continued)

*Primary Examiner* — Hong S Cho
(74) *Attorney, Agent, or Firm* — Schumaker & Sieffert, P.A.

(57) ABSTRACT

Techniques are described for reusing downstream-assigned labels when establishing a new instance of a label switched path (LSP) prior to tearing down an existing instance of the LSP using make-before-break (MBB) procedures for RSVP. The techniques enable a routing engine of any non-ingress router along a path of the new LSP instance to reuse a previously allocated label for the existing LSP instance as the downstream assigned label for the new LSP instance when the paths of the existing LSP instance and the new LSP instance overlap. In this way, the non-ingress router does not need to update a label route in its forwarding plane for the reused label. When the new LSP instance completely overlaps the existing LSP instance, an ingress router of the LSP (Continued)

may avoid updating an ingress route in its forwarding plane for applications that use the LSP.

18 Claims, 5 Drawing Sheets

(56) References Cited

U.S. PATENT DOCUMENTS

| | | | |
|---|---|---|---|
| 8,611,359 | B1 | 12/2013 | Kompella et al. |
| 8,681,637 | B2 * | 3/2014 | Vigoureux .......... H04L 12/4633 370/216 |
| 9,071,541 | B2 | 6/2015 | Atlas et al. |
| 9,077,561 | B2 | 7/2015 | Kotrabasappa et al. |
| 9,253,250 | B2 * | 2/2016 | Asati .................. H04L 67/10 |
| 9,838,306 | B2 | 12/2017 | Shen et al. |
| 9,843,508 | B2 | 12/2017 | Dai et al. |
| 2003/0063613 | A1 | 4/2003 | Carpini et al. |
| 2005/0169266 | A1 | 8/2005 | Aggarwal et al. |
| 2011/0063972 | A1 | 3/2011 | Muley et al. |
| 2011/0182186 | A1 | 7/2011 | Vigoureux et al. |
| 2012/0257886 | A1 | 10/2012 | Sun et al. |
| 2013/0232193 | A1 | 9/2013 | Ali et al. |
| 2013/0286846 | A1 | 10/2013 | Atlas et al. |
| 2014/0348028 | A1 | 11/2014 | Chen et al. |
| 2016/0261494 | A1 | 9/2016 | Dai et al. |
| 2016/0294683 | A1 | 10/2016 | Shen et al. |

FOREIGN PATENT DOCUMENTS

| | | |
|---|---|---|
| CN | 102098210 A | 6/2011 |
| CN | 102132525 A | 7/2011 |
| CN | 103368843 A | 10/2013 |
| CN | 103379042 A | 10/2013 |
| WO | 2010023511 A1 | 3/2010 |

OTHER PUBLICATIONS

Awduche et al., "RSVP-TE: Extensions to RSVP for LSP Tunnels," RFC 3209, Network Working Group, The Internet Society, Dec. 2001, 61 pp.

Berger, "Generalized Multi—Protocol Label Switching (GMPLS) Signaling Resource ReserVation Protocol—Traffic Engineering (RSVP-TE) Extensions," RFC 3473, Network Working Group, The Internet Society, Jan. 2003, 42 pp.

Braden et al., "Resorce ReSerVation Protocol (Rsvp)—Version 1 Message Processing Rules," RFC 2209, Network Working Group, Sep. 1997, 25 pp.

Dai et al., "MPLS RSVP-TE MMB Label Reuse, draft-dai-mpls-rsvp-to-mbb-label-reuse-00," Internet-Draft, Network Working Group, Mar. 9, 2015, 7 pp.

Extended Search Report from counterpart European Application No. 16158777.9, dated Jun. 8, 2016, 8 pp.

Pan et al., "Fast Reroute Extensions to RSVP-TE for LSP Tunnels," RFC 4090, Network Working Group, May 2005, 38 pp.

Response to European Communication dated Sep. 12, 2016, from counterpart European Application No. 16158777.9, filed on Mar. 7, 2017, 15 pp.

Examination Report from counterpart European Application No. 16158777.9, dated Jan. 4, 2018, 7 pp.

Bradner, "Key words for use in RFCs to Indicate Requirement Levels," RFC 2119, Network Working Group, Mar. 1997, 4 pp.

Crocker, "Augmented BNF for Syntax Specifications: ABNF," RFC 2234, Network Working Group, Nov. 1997, 15 pp.

Dai et al., "MPLS RSVP-TE MBB Label Resuse, draft-dai-mpls-rsvp-to-mbb-label-reuse-01," Internet-Draft, Network Norking Group, Sep. 9, 2015, 6 pp.

Prosecution History from U.S. Pat. No. 9,843,508, dated Mar. 13, 2017 through Nov. 8, 2017, 24 pp.

Prosecution History from U.S. Pat. No. 9,838,306, dated Mar. 4, 2016 through Nov. 11, 2017, 60 pp.

U.S. Appl. No. 15/473,431, by Juniper Networks, Inc. (Inventors: Boyapati et al.), filed Mar. 29, 2017.

Response to Examination Report dated Jan. 4, 2018, from counterpart European Application No. 16158777.9, filed May 3, 2018, 11 pp.

Office Action from U.S. Appl. No. 15/473,431, dated Sep. 28, 2018, 26 pp.

First Office Action and Search Report, and translation thereof, from counterpart Chinese Application No. 2016101287116, dated Aug. 30, 2018, 14 pp.

Response to Office Action dated Sep. 28, 2018, from U.S. Appl. No. 15/473,431, filed Dec. 28, 2018, 17 pp.

Notice of Allowance from U.S. Appl. No. 15/473,431, dated Feb. 19, 2019, 8 pp.

Examination Report from counterpart European Application No. 18215749.5, dated Mar. 25, 2019, 10 pp.

Aggarwal et al., "Establishing Point to Multipoint MPLS TE LSPs," Network Working Group Internet Draft, draft-raggarwa-mpls-p2mp-te-02.txt, Aug. 2004, 15 pp.

Aggarwal et al., Extensions to Resource Reservation Protocol—Traffic Engineering (RSVP-TE) for Point-to-Multipoint TE Label Switched Paths (LSPs), RFC 4875, May 2007, 53 pp.

* cited by examiner

RSVP MAKE-BEFORE-BREAK LABEL REUSE

This application is a continuation of U.S. application Ser. No. 14/682,799 filed on Apr. 9, 2015, which claims the benefit of India Patent Application No. 1116/CHE/2015, filed Mar. 6, 2015, the entire contents of each of which is incorporated herein by reference.

TECHNICAL FIELD

The disclosure relates to computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as a Border Gateway Protocol (BGP) or an Interior Gateway Protocol (IGP).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by an IGP link-state routing protocol, such as an Intermediate System—Intermediate System (ISIS) protocol or an Open Shortest Path First (OSPF) protocol.

Head-end routers of an LSP are commonly known as ingress routers, while routers at the tail-end of the LSP are commonly known as egress routers. Ingress and egress routers, as well as intermediate or transit routers along the LSP that support MPLS, are referred to generally as label switching routers (LSRs). The ingress router uses routing information, propagated from the egress router, to determine the LSP, to assign labels for the LSP, and to affix a label to each packet. The LSRs use MPLS protocols to receive MPLS label mappings from downstream LSRs and to advertise MPLS label mappings to upstream LSRs. When an LSR receives an MPLS packet from an upstream router, the LSR performs a lookup and swaps the MPLS label according to the information in its forwarding table based on the lookup and forwards the packet to the appropriate downstream LSR. The egress router removes the label from the packet and forwards the packet to its destination in accordance with non-label based packet forwarding techniques.

SUMMARY

In general, this disclosure describes techniques for reusing downstream-assigned labels when establishing a new instance of a label switched path (LSP) between an ingress router and an egress router prior to tearing down an existing instance of the LSP using make-before-break (MBB) procedures for the Resource Reservation Protocol (RSVP). The techniques described in this disclosure enable a routing engine of any non-ingress router along a path of the new LSP instance to reuse a label previously allocated for the existing LSP instance as the downstream-assigned label for the new LSP instance when the paths of the existing LSP instance and the new LSP instance overlap. In this way, the non-ingress router does not need to update a label route stored in its forwarding plane for the reused label. In addition, when the new LSP instance completely overlaps the existing LSP instance, the ingress router of the LSP may avoid updating an ingress route stored in its forwarding plane for applications that use the LSP. The disclosed techniques can reduce or avoid network churn due to a large number of label route updates during the RSVP MBB procedures.

In one example, this disclosure is directed to a method comprising receiving, by a router from an ingress router of a label switched path (LSP) established between the ingress router and an egress router, a first message requesting establishment of a second LSP instance of the LSP, the second LSP instance having a second path that at least partially overlaps a first path of a first LSP instance of the LSP; determining, by the router, whether to reuse a first label previously allocated by the router for the first LSP instance as a second label used to identify incoming traffic associated with the second LSP instance; sending, by the router to an upstream router along the second path of the second LSP instance, a second message including the second label for the second LSP instance, wherein, responsive to determining to reuse the first label, the second label included in the second message is the same as the first label previously allocated by the router; and, upon establishment of the second LSP instance and tear down of the first LSP instance by the ingress router, receiving, by the router from the upstream router along the second path of the second LSP instance, incoming traffic including the second label.

In another example, this disclosure is directed to a router comprising a routing engine comprising one or more processors configured to receive, from an ingress router of a label switched path (LSP) established between the ingress router and an egress router, a first message requesting establishment of a second LSP instance of the LSP, the second LSP instance having a second path that at least partially overlaps a first path of a first LSP instance of the LSP, determine whether to reuse a first label previously allocated by the router for the first LSP instance as a second label used to identify incoming traffic associated with the second LSP instance, and send a second message including the second label for the second LSP instance to an upstream router along the second path of the second LSP instance, wherein, responsive to determining to reuse the first label, the second label included in the second message is the same as the first label previously allocated by the router. The router further comprises a forwarding engine comprising one or more processors configured to, upon establishment of the second LSP instance and tear down of the first LSP instance by the ingress router, receive incoming traffic including the second label from the upstream router along the second path of the second LSP instance.

In a further example, this disclosure is directed to a non-transitory computer-readable medium comprising instructions that when executed cause one or more programmable processors of a router to receive, by a router from an ingress router of a label switched path (LSP) established between the ingress router and an egress router, a first message requesting establishment of a second LSP instance of the LSP, the second LSP instance having a second path that at least partially overlaps a first path of a first LSP instance of the LSP; determine, by the router, whether to reuse a first label previously allocated by the router for the first LSP instance as a second label used to identify incoming traffic associated with the second LSP instance; send, by the router to an upstream router along the second path of the second LSP instance, a second message including the second label for the second LSP instance, wherein, responsive to determining to reuse the first label, the second label included in the second message is the same as the first label previously allocated by the router; and upon establishment of the second LSP instance and tear down of the first LSP instance by the ingress router, receive, by the router from the upstream router along the second path of the second LSP instance, incoming traffic including the second label.

In another example, this disclosure is directed to a system comprising an ingress router of a label switched path (LSP) established between the ingress router and an egress router, the ingress router configured to send a first message requesting establishment of a second LSP instance of the LSP, the message indicating a second path of the second LSP instance that at least partially overlaps a first path of a first LSP instance of the LSP; and at least one downstream router of the LSP configured to, in response to the first message requesting establishment of the second LSP instance, determine whether to reuse a first label previously allocated by the downstream router for the first LSP instance as a second label used by the downstream router to identify incoming traffic associated with the second LSP instance, and send a second message including the second label for the second LSP instance to an upstream router along the second path of the second LSP instance, wherein, responsive to determining to reuse the first label, the second label included in the second message is the same as the first label previously allocated by the downstream router. Upon establishment of the second LSP instance, the ingress router is further configured to tear down the first LSP instance of the LSP, and send traffic along the second path of the second LSP instance toward the egress router of the LSP.

The details of one or more examples are set forth in the accompanying drawings and the description below. Other features, objects, and advantages will be apparent from the description and drawings, and from the claims.

DETAILED DESCRIPTION

Figure 1:
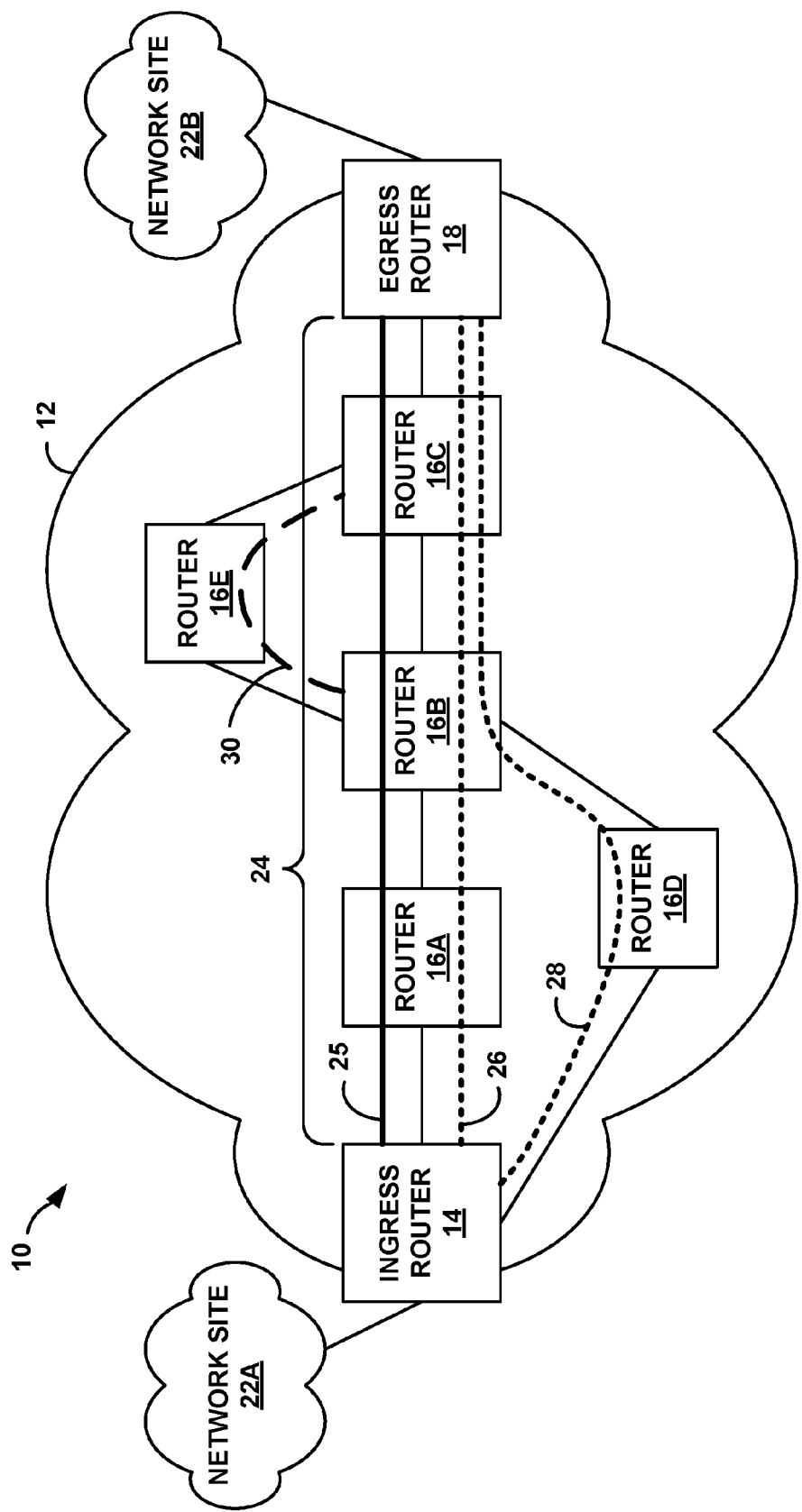
FIG. 1 is a block diagram illustrating an example system in which routers are configured to forward network traffic in accordance with the techniques of this disclosure.

FIG. 1 is a block diagram illustrating an example network system 10 in which ingress router 14, transit routers 16A-16E ("transit routers 16"), and egress router 18 of network 12 are configured to forward network traffic (e.g., network packets) in accordance with the techniques of this disclosure. In the example of FIG. 1, ingress router 14 is an ingress router of label switched path (LSP) 24 and egress router 18 is the egress router of LSP 24. Transit routers 16A, 16B and 16C are intermediate or transit routers along a first path of a first LSP instance 25 (represented as a solid line) of LSP 24.

Routers 14, 16 and 18 represent any network device that routes or otherwise forwards traffic through network 12. Typically, routers 14, 16, 18 represent a L3 packet-switching device that operates at L3 to exchange routing information that describes a current topology of network 12 using a routing protocol, such as an Interior Gateway Protocol (IGP) or a Border Gateway Protocol (BGP). Routers 14, 16, 18 then process this routing information, selecting paths through its representation of the topology of network 12 to reach all available destinations to generate forwarding information. In other words, routers 14, 16, 18 reduce these paths to so-called "next hops" which identify interfaces to which to forward packets destined for a particular destination, where the forwarding information includes this list of next hops. Routers 14, 16, 18 then install this forwarding information in a forwarding plane of the router, whereupon the forwarding plane forwards received traffic in accordance with the forwarding information.

Network 12 may comprise an Internet Protocol (IP) network that uses Multi-Protocol Label Switching (MPLS) protocols to engineer traffic patterns over an MPLS core of the IP network. By utilizing MPLS, ingress router 14 and egress router 18 can request distinct paths, i.e., label switched paths (LSPs), through network 12 to carry packets between customers or subscribers in remote network sites 22A-22B ("network sites 22"). A short label associated with a particular LSP, e.g., LSP 24, is affixed to the packets that travel through network 12 via LSP 24. Transit routers 16 along the path cooperatively perform MPLS operations to forward the packets along the established LSP 24. A variety of protocols exist for establishing LSPs, e.g., the Label Distribution Protocol (LDP) and the Resource Reservation Protocol with Traffic Engineering extensions (RSVP-TE).

In some examples, network 12 may be a service provider network. For example, network 12 may represent one or more networks owned and operated by a service provider (which is commonly a private entity) that offer one or more services for consumption by customers or subscribers in network sites 22. In this context, network 12 is typically a layer three (L3) packet-switched network that provides L3 connectivity between a public network, such as the Internet, and one or more network sites 22. Often, this L3 connectivity provided by service provider network 12 is marketed as a data service or Internet service, and subscribers in network sites 22 may subscribe to this data service. Network 12 may represent a L3 packet-switched network that provides data, voice, television and any other type of service for purchase by subscribers and subsequent consumption by the subscribers in network sites 22.

Network sites 22 may be local area networks (LANs), wide area networks (WANs), or other private networks that include a plurality of subscriber devices (not shown). In some examples, network sites 22 may comprise distributed network sites of the same customer enterprise. In other examples, network sites 22 may belong to different entities. Subscriber devices within network sites 22 may include personal computers, laptops, workstations, personal digital assistants (PDAs), wireless devices, network-ready appliances, file servers, print servers or other devices capable of requesting and receiving data via network 12. While not shown in the example of FIG. 1, network system 10 may include additional service provider networks, subscriber networks and other types of networks, such as access networks, private networks, or any other type of network.

According to the techniques of this disclosure, routers 14, 16, 18 use RSVP-TE to establish instances of LSP 24. For example, ingress router 14 sends an RSVP Path message towards egress router 18 requesting establishment of first LSP instance 25 of LSP 24. The RSVP Path message includes a label request object that requests transit routers 16 and egress router 18 to provide a downstream-assigned label for first LSP instance 25 of LSP 24. The RSVP Path message also includes a session object associated with LSP 24 that aids in session identification and diagnostics. In some cases, the RSVP Path message may include an explicit route object (ERO) that specifies the first path of first LSP instance 25 between ingress router 14 and egress router 18. If one of transit routers 16 receives the RSVP Path message propagated downstream from ingress router 14 and is incapable of providing the requested label (e.g., cannot satisfy admission control requirements of first LSP instance 25), the transit router sends a PathErr message to ingress router 14. If the label request object included in the RSVP Path message is not supported end to end along the first path of first LSP instance 25 of LSP 24, ingress router 14 will be notified by the first one of transit routers 16 that does not provide support.

Egress router 18 of LSP 24 receives the RSVP Path message for first LSP instance 25 and responds to the label request object in the RSVP Path message by including a label object in its response RSVP Resv message. Egress router 18 sends the RSVP Resv message back upstream towards ingress router 14 following the path state created by the RSVP Path message in reverse order. Each of transit routers 16 along the first path of first LSP instance 25 receives the RSVP Resv message including a label object from a next hop router, and uses the received downstream label to identify outgoing traffic associated with first LSP instance 25. Each of transit routers 16 along the first path of first LSP instance 25 then allocates a new label, places that label in the corresponding label object of the RSVP Resv message, and sends the RSVP Resv message upstream towards ingress router 14. The label sent upstream in the label object of the RSVP Resv message from a given one of transit routers 16, e.g., transit router 16B, is the label that transit router 16B will use to identify incoming traffic associated with first LSP instance 25. Transit router 16B can then program its forwarding plane based on the received downstream label and the allocated label for first LSP instance 25 in order to map incoming labeled packets to a next hop label forwarding entry. When the RSVP Resv message reaches ingress router 14, firs LSP instance 25 of LSP 24 is effectively established.

One of the requirements for traffic engineering is the capability to reroute an established LSP under a number of conditions based on administrative policy. For example, in some cases, an administrative policy may dictate that a given LSP be rerouted when a more optimal route becomes available. In another case, a given LSP may be rerouted when admission control requirements for the LSP change. A common admission control requirement change is a bandwidth requirement change, especially with a widely implemented auto-bandwidth feature that adjusts LSP bandwidth automatically based on feedback from traffic monitoring. In a further case, a given LSP may be rerouted upon failure of a resource, e.g., a node or a link, along an established path of the LSP. In general, it is highly desirable not to disrupt traffic or adversely impact network operations while rerouting an existing LSP. This rerouting requirement necessitates establishing a new LSP instance and transferring traffic from an existing LSP instance onto the new LSP instance before tearing down the existing LSP instance. This concept is referred to as make-before-break (MBB).

A problem may arise in MBB procedures, however, because the existing LSP instance and the new LSP instance may compete with each other for resources on network segments that the instances have in common, i.e., overlap. Depending on the availability of resources, this competition can cause admission control to prevent the new LSP instance from being established. For RSVP to support MBB procedures, it is necessary that, on links that are common between the existing and new LSP instances, resources used by the existing LSP instance should not be released before traffic is transitioned to the new LSP instance, and resource reservations should not be counted twice between the existing LSP instance and the new LSP instance because this might cause admission control to reject the new LSP instance.

In order to perform a reroute of LSP 24, ingress router 14 selects a new LSP ID and sends a new RSVP Path Message towards egress router 18 using the original session object and a new explicit route object (ERO) to define a second path for a second LSP instance 26 or 28 (represented as dotted lines) of LSP 24. During establishment of second LSP instances 26 or 28, ingress router 14 continues to use first LSP instance 25 and refresh the RSVP Path message for first LSP instance 25 of LSP 24. On links that do not overlap between first LSP instance 25 and second LSP instance 26 or 28, the new RSVP Path message is treated as a conventional new LSP instance setup. On links that do overlap between first LSP instance 25 and second LSP instance 26 or 28, the shared session object allows second LSP instance 26 or 28 to be established using resources that are shared with first LSP instance 25. Once ingress node 14 receives a RSVP Resv message for second LSP instance 26 or 28, the second LSP instance 26 or 28 is established. Ingress router 14 then transitions traffic to second LSP instance 26 or 28, and tears down first LSP instance 25 using RSVP MBB procedures. For additional details of the RSVP MBB procedures, see D. Awduche, "RSVP-TE: Extensions to RSVP for LSP Tunnels," Network Working Group RFC 3209, December 2001, the entire contents of which are incorporated by reference herein.

In the current RSVP MBB procedures, described in more detail in RFC 3209, downstream label assignment behavior of the non-ingress routers for new LSP instances is not well defined. As a general practice, each non-ingress router along the path of the new LSP instance assigns a new and different label for the new LSP instance. In this case, there is a completely separate LSP for the new LSP instance end to end, with the exception of penultimate hop popping (PHP)

in which the new LSP instance shares the implicit/explicit null label with the existing LSP instance for the last segment of the LSP. The new and different labels for each LSP instance allow end to end path verification for each LSP instance independently. The new and different labels for each LSP instance, however, also require each non-ingress router along the path of the new LSP instance to perform a label route add in its forwarding plane to associate the newly allocated label with the LSP, and subsequently perform a label route delete in its forwarding plane to remove the existing label associated with the LSP. In addition, the ingress router of the LSP performs ingress route updates in its forwarding plane when switching to the new LSP instance. For example, the ingress router updates applications that use the LSP in order to transmit traffic according the new ingress route that associates a different outgoing label with the new LSP instance. The ingress route updates performed by the ingress router may also cause other elements of the network, which are dependent on the LSP, to perform updates.

The techniques of this disclosure enable routers of an existing LSP to keep or reuse the same labels across different LSP instances, where possible without affecting either routing functionalities or data path verification of each LSP instance, in order to avoid or reduce network churn cause by label route updates during the RSVP MBB procedures. In addition, keeping or reusing labels according to the disclosed techniques may speed up establishment of the new LSP instance due to not needing to wait for label route and ingress route updates and forwarding plane programming at each router along the path of the new LSP instance.

According to the techniques described in this disclosure, routers of an LSP may be configured to reuse labels during RSVP MBB procedures when the primary paths of an existing LSP instance and a new LSP instance at least partially overlap. For example, a routing engine of any non-ingress router (e.g., any of transit routers 16 or egress router 18) along the path of second LSP instance 26 or 28 may be configured to reuse a first label previously allocated for first LSP instance 25 as a second label for second LSP instance 26 or 28 when the first and second LSP instances overlap at the non-ingress router. In this way, the non-ingress router does not need to update a label route entry in a label forwarding information base (LFIB) stored in its forwarding plane for the reused label. Label reuse under partial or total overlap condition reduces unnecessary LFIB updates, which further reduces the possibility of error and improves network convergence latency.

In one example, as illustrated in FIG. 1, a primary path of first LSP instance 25 of LSP 24 has complete overlap with a primary path of second LSP instance 26 from end to end between ingress router 14 and egress router 18. In this example, there is no need for any of egress router 18 or transit routers 16A, 16B or 16C to allocate any new labels or perform of any label route updates to establish second LSP instance 26. Instead, each of the non-ingress routers along the shared path of first LSP instance 25 and second LSP instance 26 may reuse the labels previously allocated for first LSP instance 25 as the labels used for second LSP instance 26. When first and second instances 25 and 26 have total path overlap and complete label reuse, the techniques also eliminate the need to perform data plane verification of second LSP instance 26, which further simplifies the RSVP MBB procedures. In addition, when first and second LSP instances 25 and 26 have total path overlap, ingress router 14 of LSP 24 may avoid performing an ingress route update for applications using LSP 24.

In another example, as illustrated in FIG. 1, the primary path of first LSP instance 25 of LSP 24 has partial overlap with a primary path of second LSP instance 28 from transit router 16B to egress router 18. In this example, the label reuse may start at transit router 16B and continue all the way to egress router 18 such that there is no need for egress router 18 or transit routers 16B or 16C to allocate any new labels or perform of any label route updates to establish second LSP instance 28. Instead, egress router 18, transit router 16C, and transit router 16B may reuse the labels previously allocated for first LSP instance 25 as the labels used for second LSP instance 28, but transit router 16D will allocate a new label for second LSP instance 28 and ingress router 14 will perform an ingress route update for applications using LSP 24. Because the path of second LSP instance 28 does not completely overlap the path of first LSP instance 25, a conventional data plane verification method may be used to verify second LSP instance 28. Data traversing on either first LSP instance 25 or second LSP instance 28 will take different label paths from ingress router 14 until reaching transit router 16B, which merges the traffic of the two instances into a common LSP towards egress router 18 of LSP 24.

The label reuse techniques for the RSVP MBB procedures described in this disclosure may be applied for both point-to-point (P2P) LSPs and point-to-multipoint (P2MP) LSPs. For clarity purposes, this disclosure focuses on P2P LSPs, but it should be understood that similar techniques may be adapted and applied to P2MP LSPs.

During RSVP MBB procedures, the label reuse techniques may be applied differently at each type of router, i.e., ingress routers, intermediate or transit routers, and egress routers, along LSP 24 to be rerouted. The label reuse techniques originate at egress router 18 of LSP 24. According to the disclosed techniques, in response to a new RSVP Path message requesting a reroute of LSP 24, egress router 18 sends a RSVP Resv message back upstream towards ingress router 14 of LSP 24 to establish a second LSP instance 26 or 28 that includes the same label as used for first LSP instance 25. When transit routers 16 receive the RSVP Resv message with the same label, the transit routers 16 may determine whether to send a RSVP Resv message towards ingress router 14 that also reuses the same label for second LSP instance 26 or 28 as used for first LSP instance 25. The label reuse techniques terminate at the first one of transit routers 16 where the paths of the two instances diverge towards ingress router 14 of LSP 24.

As one example, egress router 18 of LSP 24 may be configured to always reuse labels previously allocated for an existing instance of LSP 24 as the labels for a new instance of LSP 24. Egress router 18 may always reuse labels because the paths of existing and new instances of the same LSP 24 will always overlap at egress router 18 of the LSP. For example, upon receiving an RSVP Path message from ingress router 14 requesting establishment of second LSP instance 26 or 28, egress router 18 reuses a first label previously allocated by egress router 18 for first LSP instance 25 as a second label used by egress router 18 to identify incoming traffic associated with second LSP instance 26 or 28. Egress router 18 then sends an RSVP Resv message including the second label, i.e., the reused label, for second LSP instance 26 or 28 to an upstream router, i.e., transit router 16C, along the path of second LSP instance 26 or 28. By reusing the label, egress router 18 also reuses a label route entry for the reused label previously installed in its forwarding plane without performing a label route update to its forwarding plane.

As another example, transit routers 16 of LSP 24 may be configured to reuse labels previously allocated for an existing instance of LSP 24 as the labels for a new instance of LSP 24 based on one or more conditions. For example, transit router 16 of LSP 24 may reuse labels if (1) a downstream label received in a RSVP Resv message for a new LSP instance is the same as a downstream label received for the existing LSP instance, and (2) the next hop router along the path of the new LSP instance is the same as the next hop router along the path of the existing LSP instance.

For example, each of transit routers 16 receives an RSVP Resv message including a downstream label to be used by the transit router to identify outgoing traffic associated with the second LSP instance from a next hop router along the path of second LSP instance 26 or 28. Each of transit routers 16 then either allocates a new label or reuses an existing label to be used by the transit router to identify incoming traffic associated with second LSP instance 26 or 28. Upon allocating the new label or reusing the existing label for second LSP instance 26 or 28, each of transit routers 16 sends an RSVP Resv message including the label for second LSP instance 26 or 28 to an upstream router along the path of second LSP instance 26 or 28.

In one example of second LSP instance 26 having a path that completely overlaps the path of first LSP instance 25, any of transit routers 16A, 16B and 16C may receive an RSVP Resv message including a reused downstream label for second LSP instance 26 from a next hop router along the shared path. Because the received downstream label for second LSP instance 26 is the same as a downstream label previously received for first LSP instance 25 from the same next hop router, any of transit routers 16A, 16B and 16C may reuse a first label previously allocated by the transit router for first LSP instance 25 as a second label used by the transit router to identify incoming traffic associated with second LSP instance 26. By reusing the label, any of transit routers 16A, 16B and 16C also reuses a label route entry for the reused label previously installed in its forwarding plane without performing a label route update to its forwarding plane.

In the example of second LSP instance 28 having a path that only partially overlaps the path of first LSP instance 25 from transit router 16B to egress router 18, transit router 16D receives a RSVP Resv message including a downstream label for second LSP instance 28 from transit router 16B along the path of second LSP instance 28. Because transit router 16D did not previously receive a downstream label for first LSP instance 25 from transit router 16B, transit router 16D allocates a new label to identify incoming traffic associated with second LSP instance 28. Transit router 16D also installs a new label route in its forwarding plane based on the new label for second LSP instance 28.

As an additional example, ingress router 14 of LSP 24 may be configured to reuse ingress routes of an existing instance of LSP 24 for a new instance of LSP 24 based on one or more conditions. For example, ingress router 14 of LSP 24 may reuse ingress routes if (1) a downstream label received in a RSVP Resv message for a new LSP instance is the same as a downstream label received for the existing LSP instance, and (2) the next hop router along the path of the new LSP instance is the same as the next hop router along the path of the existing LSP instance. If both conditions are satisfied, ingress router 18 may avoid performing an ingress route update for applications that use LSP 24.

For example, ingress router 14 receives an RSVP Resv message including a downstream label to be used by ingress router 14 to identify outgoing traffic associated with the second LSP instance 26 or 28 from a next hop router along the path of second LSP instance 26 or 28. In the example of second LSP instance 26 having a path that completely overlaps the path of first LSP instance 25, ingress router 14 may receive a reused downstream label for second LSP instance 26 from transit router 16A. Because the received downstream label for second LSP instance 26 is the same as a downstream label previously received for first LSP instance 25 from the same transit router 16A, ingress router 14 may reuse the ingress route of first LSP instance 25 for the second LSP instance 26 without updating the ingress route in its forwarding plane. In this case, ingress router 14 does not need to update applications using LSP 24 to use a new label to identify the outgoing traffic for second LSP instance 26.

In the example of second LSP instance 28 having a path that only partially overlaps the path of first LSP instance 25 from transit router 16B to egress router 18, ingress router 14 receives a new label for second LSP instance 28 from transit router 16D. Because ingress router 14 did not previously receive a downstream label for first LSP instance 25 from transit router 16D, ingress router 14 updates the ingress route of first LSP instance 25 in its forwarding plane based on the new label for the second LSP instance 28. In this case, ingress router 14 also updates applications using LSP 24 to use the new label to identify the outgoing traffic for the second LSP instance 28.

In another example of second LSP instance 28 having a path that only partially overlaps the path of first LSP instance 25 from transit router 16B to egress router 18, ingress router 14 may coincidentally receive a label for second LSP instance 28 from transit router 16D that is the same label that ingress router 14 previously received for first LSP instance 25 from transit router 16A. Although the received downstream label for second LSP instance 28 is the same as a downstream label previously received for first LSP instance 25, ingress router 14 detects that the labels are received from different next hop routers, i.e., transit router 16D for second LSP instance 28 and transit router 16A for first LSP instance 25. Ingress router 14, therefore, updates the ingress route of first LSP instance 25 in its forwarding plane based on the same label and the new next hop router for the second LSP instance 28.

The conditions described above for label reuse during RSVP MBB procedures relate to an LSP without any type of fast reroute (FRR) protection. The conditions for label reuse during RSVP MBB procedures for an LSP with FRR are described below. In general, there are two types of FRR, i.e., facility based FRR and detour FRR, and the techniques for label reuse are modified differently for each type of FRR. MPLS fast reroute techniques are described in more detail in P. Pan, "Fast Reroute Extensions to RSVP-TE for LSP Tunnels," Network Working Group RFC 4090, May 2005, the entire contents of which are incorporated by reference herein.

In the illustrated example of FIG. 1, LSP 24 has FRR protection against potential failure of the link between transit router 16B and transit router 16C. In other examples, FRR protection may also be used to protect against potential failure of an intermediate node along LSP 24. In FIG. 1, transit router 16B acts as a point of local repair (PLR) to establish a backup LSP 30 (represented as a dashed line) from PLR 16B, through transit router 16E, to transit router 16C on the other side of the protected link. In this case, transit router 16C acts as a merge point (MP) at which backup LSP 30 merges back with primary LSP 24. In some cases, the FRR protection of backup LSP 30 may be established by PLR 16B in response to a request from ingress router 14. In other cases, PLR 16B may establish backup LSP 30 in response to a local configuration change by an administrator.

In the example of facility based FRR, backup LSP 30 may be a bypass LSP established to protect multiple LSPs that use the same protected link. PLR 16B may have established bypass LSP 30 as a backup instance for existing LSP instance 25 such that bypass LSP 30 satisfies admission control requirements, e.g., bandwidth requirements, for existing LSP instance 25 of LSP 24. In the illustrated example where existing LSP instance 25 and new LSP instance 26 or 28 overlap at least from PLR 16B to egress router 14 such that PLR 16B uses the same label for both instances, PLR 16B may reuse bypass LSP 30 as a backup instance for the new LSP instance 26 or 28 as long as bypass LSP 30 also satisfies the admission control requirements of new LSP instance 26 or 28 of LSP 24. If bypass LSP 30 originated by PLR 16B satisfies the admission control requirements of new LSP instance 26 or 28, then switching from existing LSP instance 25 to new LSP instance 26 or 28 does not require the routers of bypass LSP 30 to perform any label route updates. In one example, bypass LSP 30 may provide no bandwidth protection so that bypass LSP 30 always passes the admission control requirements for the new LSP instance 26 or 28 assuming that no other constraints are changed, especially in auto bandwidth applications.

If bypass LSP 30 does not satisfy the admission control requirements of new LSP instance 26 or 28, PLR 16B may establish a new backup instance of bypass LSP 30 for new LSP instance 26 or 28 that satisfies the admission control requirements of new LSP instance 26 or 28. In this case, switching from existing LSP instance 25 to new LSP instance 26 or 28 may require the routers of bypass LSP 30 to perform label route updates. As one example, if bypass LSP 30 can be re-optimized in order to meet the admission control requirements for both the existing LSP instance and the new LSP instance, PLR 16B may continue to use bypass LSP 30 as the backup instance for the new LSP instance without performing label route updates. As another example, if PLR 16B establishes a new backup instance of bypass LSP 30 for the new LSP instance 26 or 28, and the new backup instance of bypass LSP 30 completely overlaps the existing backup instance, the routers along bypass LSP 30 may reuse the labels of the existing backup instance for the new backup instance for bypass LSP 30 without performing a label route update. If, however, the new backup instance of bypass LSP 30 only partially overlaps the existing backup instance, the routers along bypass LSP 30 may need to allocate new labels and perform label route updates.

In the example of detour FRR, backup LSP 30 may be a detour LSP established to protect only existing LSP instance 25 of LSP 24. In general, a detour LSP must be signaled for each instance of a primary LSP after it is setup, and a detour LSP label is different from a primary LSP label. PLR 16B may have established detour LSP 30 as a backup instance for existing LSP instance 25 such that detour LSP 30 satisfies admission control requirements, e.g., bandwidth requirements, for existing LSP instance 25 of LSP 24. In the illustrated example where existing LSP instance 25 and new LSP instance 26 or 28 overlap at least from PLR 16B to egress router 14 such that PLR 16B uses the same label for both instances, PLR 16B may establish a new detour LSP for new LSP instance 26 or 28 that uses the same path as existing detour LSP 30 and satisfies the admission control requirements for new LSP instance 26 or 28. In this case, the routers along the shared detour path may reuse the labels previously allocated for existing detour LSP 30 to establish the new detour LSP without performing label route updates. If the path of the new detour LSP only partially overlaps the path of existing detour LSP 30, the routers along the partially shared detour path may need to allocate new labels and perform label route updates.

Figure 2:
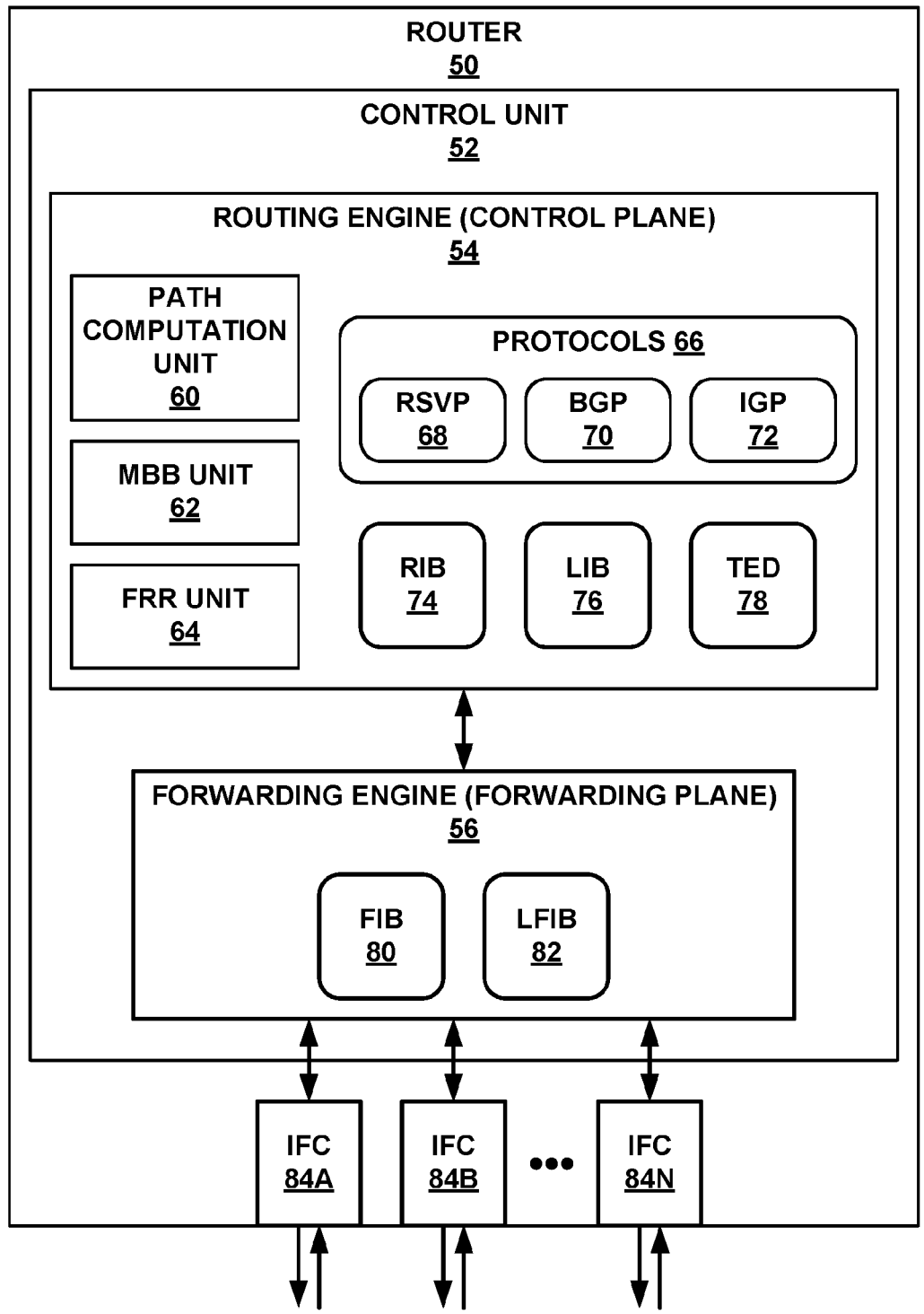
FIG. 2 is a block diagram illustrating an example of a router configured to performing the disclosed techniques of RSVP MBB label reuse.

FIG. 2 is a block diagram illustrating an example router 50 configured to perform the disclosed techniques of RSVP MBB label reuse. Router 50 may operate as any of ingress router 14, transit routers 16 and egress router 18 along the path of LSP 24 from FIG. 1. In the illustrated example of FIG. 5, router 50 includes a control unit 52 with a routing engine 54 that provides control plane functionality for the network device and a forwarding engine 56 that provides forwarding or data plane functionality for the network device to send and receive traffic by a set of interface cards 84A-84N ("IFCs 84") that typically have one or more physical network interface ports. Control unit 52 may include one or more daemons (not shown) that comprise user-level processes that run network management software, execute routing protocols to communicate with peer routers or switches, maintain and update one or more routing tables in routing engine 54, and create one or more forwarding tables for installation in forwarding engine 56, among other functions.

Forwarding engine 56 performs packet switching and forwarding of incoming data packets for transmission over a network. As shown in FIG. 2, forwarding engine 56 includes a forwarding information base (FIB) 80 that stores forwarding data structures associating network destinations with next hops and outgoing interfaces. Forwarding engine 56 also includes a label FIB (LFIB) 82 that stores label routes associating an incoming label for a given LSP with an outgoing label and a next hop router. Although not shown in FIG. 2, forwarding engine 56 may comprise a central processing unit (CPU), memory and one or more programmable packet-forwarding application-specific integrated circuits (ASICs).

Routing engine 54 includes various protocols 66 that perform routing functions for router 50. In the illustrated example of FIG. 2, routing engine 54 includes BGP 70 and IGP 72 as routing protocols used to exchange routing information with other routing devices in a network in order to discover the network topology and update a routing information base (RIB) 74. In the examples described in this disclosure, IGP 72 may be a link-state routing protocol such as open shortest path first (OSPF) or intermediate system-intermedia system (IS-IS). In addition, routing engine 54 includes RSVP 68, and specifically RSVP-TE, as a routing protocol used to establish traffic engineered paths, i.e., LSPs, with the other network devices in the network using RIB 74. Routing engine 54 uses RSVP 68 to exchange label mapping messages with other routing devices along the LSPs and update a label information base (LIB) 76.

RIB 74 may describe the topology of the network in which router 50 resides, and may also describe various routes within the network and the appropriate next hops for each route, i.e., the neighboring routing devices along each of the routes. Routing engine 54 analyzes the information stored in RIB 74 to generate forwarding information. Routing engine 54 then installs forwarding data structures into FIB 80 within forwarding engine 56. FIB 80 associates network destinations with specific next hops and corresponding interface ports within the forwarding plane. LIB 76 maintains mappings of next hop labels to the next hops for each route within the network from RIB 74. Routing engine 54 selects specific paths through the network and installs the next hop label mappings for the next hops along those specific paths in LFIB 82 within forwarding engine 56.

In some examples, routing engine 54 uses RSVP 68 to generate and maintain a traffic engineering database (TED) 78 including a complete list of nodes and links in the network that are participating in traffic engineering and a set of attributes for each of the links. For example, TED 78 may include bandwidth reservations for links associated with LSPs through the network. Routing engine 54 may use IGP 72 to advertise the traffic engineering attributes stored in TED 78 to other routing devices in the network. Routing engine 54 may also receive IGP advertisements including traffic engineering attributes from the other routing devices in the network and update TED 78.

According to the techniques described in this disclosure, routing engine 54 of router 50 may be configured to reuse labels previously allocated by RSVP 68 for an existing instance of an LSP when establishing a new instance of the same LSP using RSVP MBB procedures. In some case, the MBB procedures may be triggered by changing properties of an LSP, e.g., changes in bandwidth requirements or other admission control requirements, or by disruptions in resources along the LSP, e.g., failed links and/or nodes. MBB unit 62 in routing engine 54 may perform the RSVP MBB procedures to establish the new LSP instance before tearing down the existing LSP instance. MBB unit 62 may also perform the label reuse techniques described in this disclosure.

For example, in the case where router 50 is operating as a non-ingress (e.g., an egress router or a transit router) along a path of the new LSP instance, MBB unit 62 of routing engine 54 may determine whether to reuse a label previously allocated for the existing LSP instance as the downstream-assigned label for the new LSP instance based on whether the paths of the existing LSP instance and the new LSP instance overlap. In the case of router 50 operating as an egress router, MBB unit 62 may be configured to always reuse a label of the existing LSP instance for the new LSP instance. In the case of router 50 operating as a transit router, MBB unit 62 may be configured to reuse a label of the existing LSP instance for the new LSP instance when router 50 receives a reused label from a next hop router that is the same for both instances of the LSP. When routing engine 54 reuses a label for the new LSP instance, routing engine 54 does not need to update a label route entry for the reused label in LFIB 82 in forwarding engine 56.

In the case where router 50 is operating as an ingress router of the LSP, router 50 may receive a reused label from a next hop router that is the same for both the existing LSP instance and the new LSP instance of the LSP when the paths of the new and existing LSP instances completely overlap. In this case, MBB unit 62 may be configured to reuse an ingress route for applications that use the LSP. When the ingress route is reused, routing engine 54 does not need to update the ingress route for the LSP in LFIB 82 in forwarding engine 56.

As described in more detail with respect to FIG. 1, the label reuse techniques described in this disclosure may apply to RSVP MBB procedures for primary LSPs with or without FRR protection. In the case where FRR protection is applied to an LSP, the label reuse techniques may also be applied to the MBB procedures for the backup LSPs in either facility based FRR or detour FRR. FRR unit 64 in routing engine 54 may perform the FRR procedures to establish a backup LSP to provide link or node protection for a primary LSP. According to the disclosed techniques, MBB unit 62 may perform the RSVP MBB procedures including the label reuse techniques for the backup LSP established by FRR unit 64.

In the case where router 50 operates as an ingress router of the LSP, routing engine 54 uses path computation unit 60 to select a path for the new LSP instance between the ingress router and the egress of the LSP. For example, path computation unit 60 may use a Constrained Shortest Path First (CSPF) process to compute a shortest path for the LSP based information included in RIB 74 and TED 78 in order to satisfy admission control requirements, e.g., bandwidth requirements and other constraints, associated with the LSP. In the case where the MBB procedures where triggered due to changing admission control requirements, when CSPF is used to compute a path for the new LSP instances that meets the changed requirements, it is possible that the path of the existing LSP instance is still one of the best paths that satisfy the changed requirements. This occurrence provides the opportunity to reuse labels as described in this disclosure.

According to the disclosed techniques, path computation unit 60 may be modified to compute paths for new LSP instances that reuse as much as possible of the same path of the existing LSP instance in order to gain the largest benefit from the label reuse techniques for RSVP MBB procedures. For example, during RSVP MBB procedures, routing engine 54 may use path computation unit 60 to select a path of the new LSP instance based on an amount of overlap with the path of the first LSP instance of the LSP. In one example, path computation unit 60 may perform a modified CSPF computation to select the path of the new LSP instance from a plurality of "best" paths between the ingress router and the egress router of the LSP as the one of the best paths that has the most overlap with the path of the existing LSP instance. In another example, path computation unit 60 may be modified to select the path of the new LSP instance to be the same as the path of the existing LSP instance as long as the path of the existing LSP instance satisfies the admission control requirements of the second LSP instance. The choice of which modified path computation technique is applied by routing engine 54 may be a locally configured policy of path computation unit 60. The modified path computation techniques used to maximize path overlap between new and existing LSP instances during MBB procedures may be applied to both primary path computation and FRR backup path computation.

In some examples, router 50 may be enabled to operate in a label reuse mode of label assignment during the RSVP MBB procedures by default. In this example, an administrator would need to perform a local configuration change of router 50 to change the label assignment mode for the MBB procedures to be other than the label reuse mode. In other examples, router 50 may instead be enabled to operate in a "normal" mode of label assignment during the RSVP MBB procedures, and a change to the label reuse mode may be negotiated between router 50 and the other routing devices in the network. For example, router 50 may advertise its capability to support the label reuse mode using one of the routing protocols, such as IGP 72, BGP 70 or RSVP 68. In this example, if the label reuse mode is supported, an administrator would need to perform a local configuration change of router 50 to change the label assignment mode to the label reuse mode.

Figure 3:
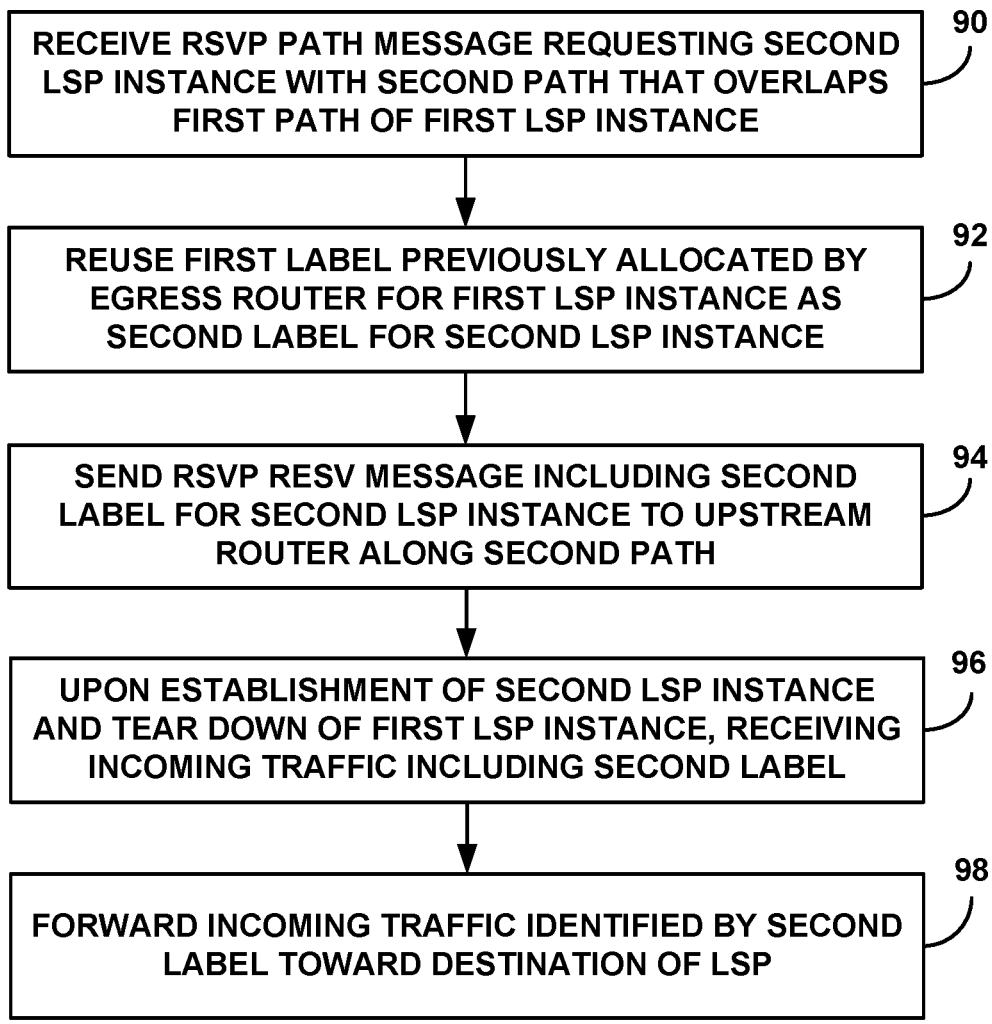
FIG. 3 is a flowchart illustrating an example operation of an egress router of an LSP in a label reuse mode of label assignment for MBB procedures.

FIG. 3 is a flowchart illustrating an example operation of an egress router of an LSP in a label reuse mode of label assignment for RSVP MBB procedures. The example operation of FIG. 3 is described with respect to router 50 from FIG. 2 when operating as an egress router of an LSP. In other examples, the operation of FIG. 3 may also be performed by egress router 18 of LSP 24 from FIG. 1.

As described above, establishment of a second LSP instance prior to tearing down a first LSP instance is part of the RSVP MBB procedures. During the RSVP MBB procedures, egress router 50 of an LSP receives an RSVP Path message from an ingress router of the LSP requesting establishment of a second LSP instance of the LSP that has a second path that at least partially overlaps a first path of a first LSP instance (90). The RSVP Path message for the second LSP instance may explicitly indicate the second path of the second LSP instance between the ingress router and egress router 50 of the LSP. The RSVP Path message for the second LSP instance propagates through the network according to the second path of the second LSP instance until it reaches egress router 50 of the LSP.

Upon receiving the RSVP Path message requesting the second LSP instance, MBB unit 62 in routing engine 54 of egress router 50 reuses a first label previously allocated by egress router 50 for the first LSP instance as a second label used by egress router 50 to identify incoming traffic associated with the second LSP instance (92). According to the techniques of this disclosure, egress router 50 may always reuse a previously allocated label for an existing instance of an LSP to egress router 50 when establishing a second instance of the same LSP using MBB procedures. This is because the paths of the first and second instances of the same LSP will always overlap at the egress router of the LSP. By reusing the previously allocated first label as the second label for the second LSP instance, routing engine 54 does not need to update forwarding engine 56 of egress router 50 by performing a label route add in LFIB 82 for the second label and subsequently performing a label route delete in LFIB 82 for the first label. Instead, forwarding engine 56 will reuse the label route installed in LFIB 82 for the first LSP instance to forward incoming traffic identified by the second label toward a destination of the LSP.

In response to the RSVP Path message requesting the second LSP instance, egress router 50 sends an RSVP Resv message including the second label for the second LSP instance, i.e., the reused label, to an upstream router, i.e., a transit router, along the second path of the second LSP instance (94). RSVP Resv messages will propagate upstream hop-by-hop according to a reverse route of the second path of the second LSP instance until a last RSVP Resv message reaches the ingress router of the LSP. The second LSP instance of the LSP is then established in the network. As part of the MBB procedures, the ingress router can tear down the first LSP instance and begin using, i.e., switchover to, the established second LSP instance to send traffic to egress router 50 of the LSP.

Upon establishment of the second LSP instance and tear down of the first LSP instance by the ingress router, forwarding engine 56 of egress router 50 may receive incoming traffic including the second label, i.e., the reused label, from the upstream router along the second path of the second LSP instance (96). Forwarding engine 56 of egress router 50 looks up the second label in LFIB 82 and forwards the incoming traffic identified by the second label toward a destination of the LSP based on the reused label route for the second label (98).

Figure 4:
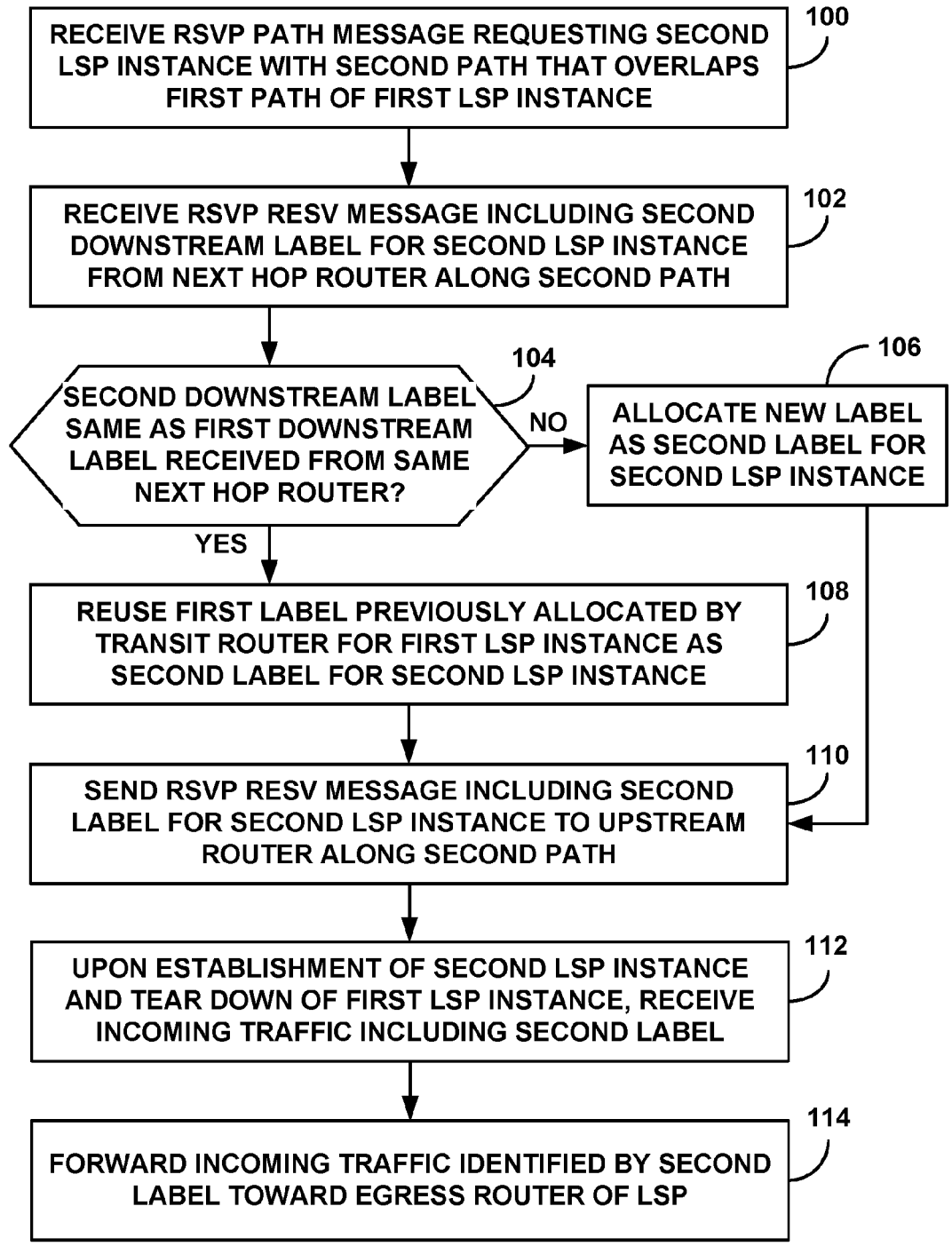
FIG. 4 is a flowchart illustrating an example operation of a transit router of an LSP in a label reuse mode of label assignment for MBB procedures.

FIG. 4 is a flowchart illustrating an example operation of a transit router of an LSP in a label reuse mode of label assignment for RSVP MBB procedures. The example operation of FIG. 4 is described with respect to router 50 from FIG. 2 when operating as a transit router of an LSP. In other examples, the operation of FIG. 4 may also be performed by any of transit routers 16 of LSP 24 from FIG. 1.

As described above, establishment of a second LSP instance prior to tearing down a first LSP instance is part of the RSVP MBB procedures. During the RSVP MBB procedures, transit router 50 of an LSP receives an RSVP Path message from an ingress router of the LSP requesting establishment of a second LSP instance of the LSP that has a second path that at least partially overlaps a first path of a first LSP instance (100). The RSVP Path message for the second LSP instance may explicitly indicate the second path of the second LSP instance between the ingress router and an egress router of the LSP. Transit router 50 forwards the RSVP Path message toward the egress router of the LSP according to the second path of the second LSP instance. The RSVP Path message for the second LSP instance propagates through the network according to the second path of the second LSP instance until it reaches the egress router of the LSP.

In response to the RSVP Path message requesting the second LSP instance, the egress router of the LSP sends an RSVP Resv message including a label for the second LSP instance to an upstream router, i.e., a transit router, along the second path of the second LSP instance. RSVP Resv messages will propagate upstream hop-by-hop according to a reverse route of the second path of the second LSP instance. At one point, transit router 50 receives a RSVP Resv message including a second downstream label for the second LSP instance from a next hop router along the second path of the second LSP instance (102). The second downstream label is used by transit router 50 to identify outgoing traffic associated with the second LSP instance forwarded to the next hop router along the second path of the second LSP instance.

In response to receiving the RSVP Resv message for the second LSP instance, transit router 50 determines whether to reuse a first label previously allocated by transit router 50 for the first LSP instance as a second label used by transit router 50 to identify incoming traffic associated with the second LSP instance. Transit router 50 makes this determination based on whether the second downstream label received from the next hop router along the second path of the second LSP instance is the same as a first downstream label previously received from the same next hop router along the first path of the first LSP instance (104). As one example, routing engine 54 of transit router 50 may compare the received second downstream label to LIB 76 to determine if it is the same as the first downstream label previously received from the same next hop router.

If the second downstream label is the same as the first downstream label previously received from the same next hop router (YES branch of 104), MBB unit 62 in routing engine 54 of transit router 50 reuses the first label previously allocated by transit router 50 for the first LSP instance as the second label used to identify the incoming traffic associated with the second LSP instance (108). According to the techniques of the disclosure, transit router 50 may reuse the previously allocated first label for the second instance of the LSP when transit router 50 is included along both the first path of the first LSP instance and the second path of the second LSP instance and the first path and the second path overlap at least from transit router 50 to the egress router of the LSP. In this way, the next hop router of transit router 50 is the same for both the first LSP instance and the second LSP instance, and transit router 50 may receive the same downstream label for both the first LSP instance and the second LSP instance from the next hop router.

By reusing the previously allocated first label as the second label for the second LSP instance, routing engine 54 does not need to update forwarding engine 56 of transit router 50 by performing a label route add in LFIB 82 for the second label and subsequently performing a label route delete in LFIB 82 for the first label. Instead, forwarding engine 56 will reuse the label route installed in LFIB 82 for the first LSP instance to forward incoming traffic identified by the second label along the second path of the second LSP instance toward the egress router of the LSP. In one example, transit routers 16A, 16B and 16C along the second path of second LSP instance 26 from FIG. 1 may operate in this way. In another example, transit routers 16B and 16C along the second path of second LSP instance 28 from FIG. 1 may operate in this way.

If the second downstream label is different than the first downstream label or if the next hop router along the second path of the second LSP instance is different than a next hop router along the first path of the first LSP instance (NO branch of 104), MBB unit 62 in routing engine 54 of transit router 50 allocates a new label as the second label used by transit router 50 to identify the incoming traffic associated with the second LSP instance (106). According to the techniques of the disclosure, transit router 50 may allocate a new label for the second instance of the LSP when transit router 50 is not included along the first path of the first LSP instance, e.g., when the first path and the second path overlap from the next hop router to the egress router of the LSP. In this case, even if the next hop router of transit router 50 is the same for both the first LSP instance and the second LSP instance, transit router 50 would not have received the first downstream label for the first LSP instance from the next hop router, and the second downstream label for the second LSP instance could not be the same as an unknown first downstream label.

In addition, transit router 50 may allocate a new label for the second instance of the LSP when transit router 50 is included along the first path of the first LSP instance but the next hop router is not included along the first path of the first LSP instance, e.g., when the first path and the second path have parallel but non-overlapping paths between transit router 50 and a next next hop router of the LSP. In this case, even if the second downstream label is coincidently the same as the first downstream label, the next hop router of transit router 50 is different for the second LSP instance than for both the first LSP instance.

By allocating a new label as the second label for the second LSP instance, routing engine 54 needs to update forwarding engine 56 of transit router 50 by performing a label route add in LFIB 82 for the newly allocated second label, and subsequently performing a label route delete in LFIB 82 for the first label once the first LSP instance is torn down. In one example, transit router 16A along the second path of second LSP instance 28 from FIG. 1 may operate in this way.

Regardless of whether transit router 50 reuses the previously allocated first label or allocates a new label as the second label for the second LSP instance, transit router 50 sends an RSVP Resv message including the second label for the second LSP instance to an upstream router, e.g., a transit router or the ingress router, along the second path of the second LSP instance (110). RSVP Resv messages will propagate upstream hop-by-hop according to a reverse route of the second path of the second LSP instance until a last RSVP Resv message reaches the ingress router of the LSP. The second LSP instance of the LSP is then established in the network. As part of the MBB procedures, the ingress router can tear down the first LSP instance and begin using, i.e., switchover to, the established second LSP instance to send traffic to the egress router of the LSP.

Upon establishment of the second LSP instance and tear down of the first LSP instance by the ingress router, forwarding engine 56 of transit router 50 may receive incoming traffic including the second label from the upstream router along the second path of the second LSP instance (112). Forwarding engine 56 of transit router 50 looks up the second label in LFIB 82 and forwards the incoming traffic identified by the second label along the second path of the second LSP instance toward the egress router of the LSP based on the label route for the second label (114). In the case where routing engine 54 of transit router 50 reuses the previously allocated first label as the second label for the second LSP instance and forwarding engine 56 reuses the label route of the first LSP instance for the second LSP instance, forwarding engine 56 forwards the incoming traffic identified by the second label based on the reused label route for the second label.

Figure 5:
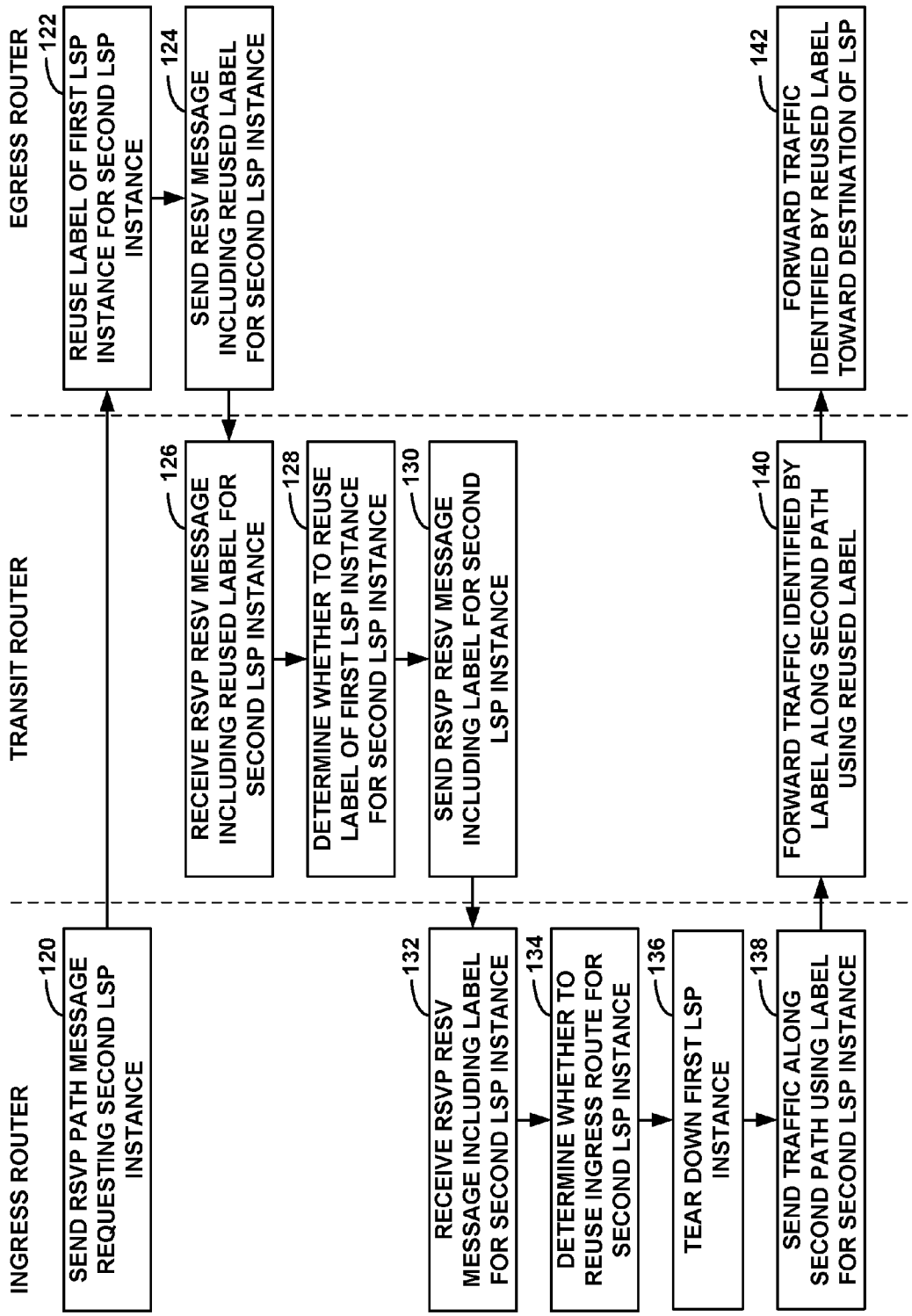
FIG. 5 is a flowchart illustrating an example operation of a system including an ingress router of an LSP and at least one downstream router of the LSP in a label reuse mode of label assignment for MBB procedures.

FIG. 5 is a flowchart illustrating an example operation of a system including an ingress router of an LSP and at least one downstream router of the LSP in a label reuse mode of label assignment for RSVP MBB procedures. The example operation of FIG. 5 is described with respect to ingress router 14, transit routers 16, and egress router 18 of LSP 24 from FIG. 1. In other examples, the operation of FIG. 5 may also be performed by router 50 from FIG. 2 when operating as each of an ingress router, a transit router, and an egress router of an LSP.

In order to establish a new instance of an LSP 24 prior to tearing down the existing instance 25 of the LSP 24 as part of the RSVP MBB procedures, ingress router 14 of LSP 24 sends an RSVP Path message requesting establishment of a second LSP instance 26, 28 of LSP 24 (120). The RSVP Path message for the second LSP instance may indicate an explicit second path of the second LSP instance 26, 28 between ingress router 14 and egress router 18 of LSP 24. In accordance with the techniques described in this disclosure, ingress router 14 may select the second path of the second LSP instance 26, 28 based on an amount of overlap with a first path of a first LSP instance 25 of LSP 24. In one example, ingress router 14 may perform a modified CSPF computation to select the second path from a plurality of best paths between ingress router 14 and egress router 18 as the one of the plurality of best paths that has the most overlap with the first path of the first LSP instance. In another example, ingress router 14 may select the second path to be the same as the first path of the first LSP instance as long as the first path satisfies admission control requirements of the second LSP instance.

The RSVP Path message for the second LSP instance propagates from ingress router 14 along transit routers 16 according to the second path of the second LSP instance 26, 28 until it reaches egress router 18 of LSP 24. According to the disclosed techniques, upon receiving the RSVP Path message requesting the second LSP instance, egress router 18 reuses a previously allocated label of the first LSP instance for the second LSP instance without updating its forwarding plane with a new label route (122). Egress router 18 sends an RSVP Resv message including the reused label for the second LSP instance upstream to transit router 16C along the second path of the second LSP instance 26, 28 (124). The operation of egress router 18 is described in greater detail above with respect to FIG. 3.

RSVP Resv messages will propagate upstream hop-by-hop along transit routers 16 according to a reverse route of the second path of the second LSP instance 26, 28 until a last RSVP Resv message reaches ingress router 14 of LSP 24. Each of transit routers 16 of LSP 24 performs the steps 126, 128 and 130. As an example, a transit router directly upstream from egress router 18 receives the RSVP Resv message including the reused label for the second LSP instance from egress router 18 (126). The reused label is used by the transit router to identify outgoing traffic associated with the second LSP instance forwarded to egress router 18 along the second path of the second LSP instance 26, 28. The transit router determines whether to reuse a previously allocated label of the first LSP instance to identify incoming traffic for the second LSP instance (128). The transit router sends an RSVP Resv message including the label for the second LSP instance to an upstream router, e.g., ingress router 14, along the second path of the second LSP instance 26, 28 (130).

In one example from FIG. 1, the first path of the first LSP instance 25 and the second path of the second LSP instance 26 overlap from ingress router 14 to egress router 18. In this example, according to the disclosed techniques, each of transit routers 16A, 16B and 16C may reuse the previously allocated label of the first LSP instance 25 for the second LSP instance 26 without updating its forwarding plane with a new label route. In another example from FIG. 1, the first path of the first LSP instance 25 and the second path of the second LSP instance 28 only partially overlap from transit router 16B to egress router 18. In this example, according to the disclosed techniques, each of transit routers 16B and 16C may reuse the previously allocated label of the first LSP instance 25 for the second LSP instance 28 without updating its forwarding plane with a new label route. In addition, transit router 16D, which is not included along the first path of first LSP instance 25, allocates a new label for the second LSP instance 28, and updates its forwarding plane with a new label route for the second LSP instance 28. The operation of each of transit routers 16 is described in greater detail above with respect to FIG. 4.

Ingress router 14 receives the RSVP Resv message including the label used to identify outgoing traffic for the second LSP instance from the next hop transit router along the second path of the second LSP instance 26, 28 (132). Ingress router 14 determines whether to reuse an ingress route of the first LSP instance 25 for the second LSP instance 26, 28 (134). In the example from FIG. 1 where the second path of second LSP instance 26 completely overlaps the first path of first LSP instance 25 from ingress router 14 to egress router 18, ingress router 14 receives a reused label for the second LSP instance 26 from next hop transit router 16A, and reuses the ingress route of the first LSP instance 25 for the second LSP instance 26 without updating the ingress route in its forwarding plane. In this case, ingress router 14 does not need to update applications using LSP 24 to use a new label to identify the outgoing traffic for the second LSP instance 26. In the example from FIG. 1 where the second path of the second LSP instance 28 only partially overlaps the first path of first LSP instance 25 from transit router 16B to egress router 18, ingress router 14 receives a new label for the second LSP instance 28 from next hop transit router 16D, and updates the ingress route of the first LSP instance 25 in its forwarding plane based on the new label for the second LSP instance 28. In this case, ingress router 14 also updates applications using LSP 24 to use the new label to identify the outgoing traffic for the second LSP instance 28.

Upon receiving the RSVP Resv message for the second LSP instance 26, 28 at ingress router 14, the second LSP instance 26, 28 of LSP 24 is established. As part of the MBB procedures, ingress router 14 tears down the first LSP instance 25 of LSP 24 (136). Ingress router 14 then sends traffic of an application along the second path of the second LSP instance 26, 28 using the label for the second LSP instance (138). The traffic propagates from ingress router 14 hop-by-hop to each of transit routers 16 along the second path of the second LSP instance 26, 28 until it reaches egress router 18 of LSP 24. As an example, a transit router directly upstream from egress router 18 forwards incoming traffic identified by a label for the second LSP instance along the second path of the second LSP instance 26, 28 toward egress router 18 using the reused label (140). Egress router 18 then forwards the incoming traffic identified by the reused label toward a destination of LSP 24 (142).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:

1. A method comprising:
   receiving, by a router from an upstream router of a label switched path (LSP) established between an ingress router and an egress router, a first message requesting establishment of a second LSP instance of the LSP, the second LSP instance having a second path that at least partially overlaps a first path of a first LSP instance of the LSP;
   receiving, by the router from a next hop router along the second path of the second LSP instance, a second message including a second downstream label used to identify outgoing traffic associated with the second LSP instance;
   in response to receiving the second message, determining, by the router, to reuse a label previously allocated by the router for the first LSP instance to identify incoming traffic associated with the second LSP instance, wherein determining to reuse the label comprises determining, by the router, that the second downstream label is the same as a first downstream label previously received by the router from the same next hop router for the first LSP instance;
   sending, by the router to the upstream router along the second path of the second LSP instance, a third message including the label for the second LSP instance, wherein the label is the same for the first LSP instance and the second LSP instance; and
   upon establishment of the second LSP instance and tear down of the first LSP instance by the ingress router, receiving, by the router from the upstream router along the second path of the second LSP instance, incoming traffic including the label.

2. The method of claim 1, further comprising, in response to determining to reuse the label, reusing a label route installed in a forwarding plane of the router for the first LSP instance to forward the incoming traffic including the label for the second LSP instance without updating the label route.

3. The method of claim 1, wherein the first message received from the upstream router requesting establishment of the second LSP instance indicates the second path of the second LSP instance between the ingress router and the egress router of the LSP, and wherein the second path is selected by the ingress router based on an amount of overlap with the first path of the first LSP instance.

4. The method of claim 1, wherein the LSP is protected by a bypass LSP established by the router as a first backup instance for the first LSP instance, the method further comprising, based on the bypass LSP satisfying admission control requirements of the second LSP instance, reusing the bypass LSP as a second backup instance for the second LSP instance without updating a forwarding plane of the router.

5. The method of claim 1, wherein the LSP is protected by a bypass LSP established by the router as a first backup instance for the first LSP instance, the method further comprising, based on the bypass LSP not satisfying admission control requirements of the second LSP instance, establishing a second backup instance of the bypass LSP for the second LSP instance that satisfies the admission control requirements of the second LSP instance, wherein the second backup instance overlaps the first backup instance, and reuses labels previously allocated for the first backup instance without updating a forwarding plane of the router.

6. The method of claim 1, wherein the LSP is protected by a first detour LSP established by the router for the first LSP instance, the method further comprising establishing a second detour LSP for the second LSP instance that satisfies admission control requirements for the second LSP instance, wherein a path of the second detour LSP overlaps a path of the first detour LSP, and reuses labels previously allocated for the first detour LSP without updating a forwarding plane of the router.

7. A router comprising:
   a routing engine comprising one or more processors configured to:
      receive, from an upstream router of a label switched path (LSP) established between an ingress router and an egress router, a first message requesting establishment of a second LSP instance of the LSP, the second LSP instance having a second path that at least partially overlaps a first path of a first LSP instance of the LSP,
      receive, from a next hop router along the second path of the second LSP instance, a second message including a second downstream label used to identify outgoing traffic associated with the second LSP instance,
      in response to receipt of the second message, determine to reuse a label previously allocated by the router for the first LSP instance to identify incoming traffic associated with the second LSP instance, wherein, to determine to reuse the label, the routing engine configured to determine that the second downstream label is the same as a first downstream label previously received by the router from the same next hop router for the first LSP instance, and
      send a third message including the label for the second LSP instance to the upstream router along the second path of the second LSP instance, wherein the label is the same for the first LSP instance and the second LSP instance; and
   a forwarding engine comprising one or more processors configured to, upon establishment of the second LSP instance and tear down of the first LSP instance by the ingress router, receive incoming traffic including the label from the upstream router along the second path of the second LSP instance.

8. The router of claim 7, wherein, in response to determining to reuse the label, the routing engine is further configured to reuse a label route installed in the forwarding engine of the router for the first LSP instance to forward the incoming traffic including the label for the second LSP instance without updating the label route.

9. The router of claim 7, wherein the first message received from the upstream router requesting establishment of the second LSP instance indicates the second path of the second LSP instance between the ingress router and the egress router of the LSP, and wherein the second path is selected by the ingress router based on an amount of overlap with the first path of the first LSP instance.

10. The router of claim 7, wherein the LSP is protected by a bypass LSP established by the router as a first backup instance for the first LSP instance, and wherein the routing engine is further configured to, based on the bypass LSP satisfying admission control requirements of the second LSP instance, reuse the bypass LSP as a second backup instance for the second LSP instance without updating the forwarding engine of the router.

11. The router of claim 7, wherein the LSP is protected by a bypass LSP established by the router as a first backup instance for the first LSP instance, and wherein the routing engine is further configured to, based on the bypass LSP not satisfying admission control requirements of the second LSP instance, establish a second backup instance of the bypass LSP for the second LSP instance that satisfies the admission control requirements of the second LSP instance, wherein the second backup instance overlaps the first backup instance, and reuses labels previously allocated for the first backup instance without updating the forwarding engine of the router.

12. The router of claim 7, wherein the LSP is protected by a first detour LSP established by the router for the first LSP instance, and wherein the routing engine is further configured to establish a second detour LSP for the second LSP instance that satisfies admission control requirements for the second LSP instance, wherein a path of the second detour LSP overlaps a path of the first detour LSP, and reuses labels previously allocated for the first detour LSP without updating the forwarding engine of the router.

13. A non-transitory computer-readable medium comprising instructions that when executed cause one or more programmable processors of a router to:
- receive, by the router from an upstream router of a label switched path (LSP) established between an ingress router and an egress router, a first message requesting establishment of a second LSP instance of the LSP, the second LSP instance having a second path that at least partially overlaps a first path of a first LSP instance of the LSP;
- receive, by the router from a next hop router along the second path of the second LSP instance, a second message including a second downstream label used to identify outgoing traffic associated with the second LSP instance;
- in response to receiving the second message, determine, by the router, to reuse a label previously allocated by the router for the first LSP instance to identify incoming traffic associated with the second LSP instance, wherein, to determine to reuse the label, the instructions cause the one or more programmable processors to determine, by the router, that the second downstream label is the same as a first downstream label previously received by the router from the same next hop router for the first LSP instance;
- send, by the router to the upstream router along the second path of the second LSP instance, a third message including the label for the second LSP instance, wherein the label is the same for the first LSP instance and the second LSP instance; and
- upon establishment of the second LSP instance and tear down of the first LSP instance by the ingress router, receive, by the router from the upstream router along the second path of the second LSP instance, incoming traffic including the label.

14. The non-transitory computer-readable medium of claim 13, wherein the instructions cause the one or more programmable processors to, in response to determining to reuse the label, reuse a label route installed in a forwarding plane of the router for the first LSP instance to forward the incoming traffic including the label for the second LSP instance without updating the label route.

15. The non-transitory computer-readable medium of claim 13, wherein the first message received from the upstream router requesting establishment of the second LSP instance indicates the second path of the second LSP instance between the ingress router and the egress router of the LSP, and wherein the second path is selected by the ingress router based on an amount of overlap with the first path of the first LSP instance.

16. The non-transitory computer-readable medium of claim 13, wherein the LSP is protected by a bypass LSP established by the router as a first backup instance for the first LSP instance, and wherein the instructions cause the one or more programmable processors to, based on the bypass LSP satisfying admission control requirements of the second LSP instance, reuse the bypass LSP as a second backup instance for the second LSP instance without updating a forwarding plane of the router.

17. The non-transitory computer-readable medium of claim 13, wherein the LSP is protected by a bypass LSP established by the router as a first backup instance for the first LSP instance, and wherein the instructions cause the one or more programmable processors to, based on the bypass LSP not satisfying admission control requirements of the second LSP instance, establish a second backup instance of the bypass LSP for the second LSP instance that satisfies the admission control requirements of the second LSP instance, wherein the second backup instance overlaps the first backup instance, and reuses labels previously allocated for the first backup instance without updating a forwarding plane of the router.

18. The non-transitory computer-readable medium of claim 13, wherein the LSP is protected by a first detour LSP established by the router for the first LSP instance, and wherein the instructions cause the one or more programmable processors to establish a second detour LSP for the second LSP instance that satisfies admission control requirements for the second LSP instance, wherein a path of the second detour LSP overlaps a path of the first detour LSP, and reuses labels previously allocated for the first detour LSP without updating a forwarding plane of the router.

* * * * *